United States Patent
Chen

(10) Patent No.: US 12,042,817 B2
(45) Date of Patent: Jul. 23, 2024

(54) GLUE DISPENSING SYSTEM AND GLUE SUPPLYING METHOD THEREOF

(71) Applicant: KULICKE AND SOFFA HI-TECH CO., LTD.

(72) Inventor: Lu-Min Chen, Taipei (TW)

(73) Assignee: Kulicke and Soffa Industries, Inc., Fort washington, PA (US)

( * ) Notice: Subject to any disclaimer, the term of this patent is extended or adjusted under 35 U.S.C. 154(b) by 245 days.

(21) Appl. No.: 17/834,882

(22) Filed: Jun. 7, 2022

(65) Prior Publication Data

US 2023/0311154 A1 Oct. 5, 2023

(30) Foreign Application Priority Data

Mar. 31, 2022 (TW) .................................. 111112380

(51) Int. Cl.
*B05C 5/02* (2006.01)
*B05D 5/10* (2006.01)
*G05D 9/12* (2006.01)

(52) U.S. Cl.
CPC .............. *B05C 5/0225* (2013.01); *B05D 5/10* (2013.01); *G05D 9/12* (2013.01)

(58) Field of Classification Search
CPC ....... B05C 5/0025; B05C 5/10; B05C 11/101; B05C 11/1036; G05D 9/12
See application file for complete search history.

(56) References Cited

U.S. PATENT DOCUMENTS

| | | | | |
|---|---|---|---|---|
| 5,873,528 A | * | 2/1999 | Lewis | B05C 5/0225 239/584 |
| 5,875,922 A | * | 3/1999 | Chastine | B05C 5/0225 335/219 |
| 7,717,059 B2 | * | 5/2010 | Wanthal | B05B 7/0025 118/712 |
| 8,069,653 B2 | * | 12/2011 | Ganzer | F16K 25/005 239/533.9 |
| 2009/0095730 A1 | * | 4/2009 | Ganzer | B29B 13/022 222/146.2 |
| 2013/0001316 A1 | * | 1/2013 | Liu | B05C 11/1047 239/569 |
| 2014/0116525 A1 | * | 5/2014 | Bondeson | B05C 11/1007 137/13 |
| 2017/0355105 A1 | * | 12/2017 | Varga | E06B 3/9612 |

FOREIGN PATENT DOCUMENTS

| | | |
|---|---|---|
| TW | 201501812 | 1/2015 |
| TW | M573968 | 2/2019 |
| TW | M630735 | 8/2022 |

OTHER PUBLICATIONS

Taiwanese Search Report for Taiwanese patent application No. 111112380 completed Oct. 11, 2022.

* cited by examiner

*Primary Examiner* — Vishal Pancholi
(74) *Attorney, Agent, or Firm* — Christopher M. Spletzer, Sr.

(57) ABSTRACT

A glue dispensing system and the glue supplying method thereof are disclosed. The glue dispensing system uses at least one feed tank to provide or supply the glue to a glue dispensing needle cylinder. Thus, the glue dispensing needle cylinder does not need to be replaced or the frequency of replacing the glue dispensing needle cylinder can be decreased in order to save more time, reduce manpower waste and decrease the cost.

20 Claims, 5 Drawing Sheets

GLUE DISPENSING SYSTEM AND GLUE SUPPLYING METHOD THEREOF

BACKGROUND OF THE INVENTION

1. Field of the Invention

The present invention relates to a glue dispensing system and the glue supplying method thereof, in particular to a system and the method thereof for supplying glue to a glue dispensing needle cylinder.

2. Description of the Prior Art

The bonding technology used in the semiconductor industry can bond chips to substrates or bond chips to chips. The most important step, also the core step, is the glue dispensing process. The glue dispensing process is to add the glue to the bonding position of a chip or a substrate and put another chip on the bonding position in order to bond the chip to the substrate or bond the chip to the chip.

Glue dispenser is a necessary device for a glue dispensing process. There are two most-frequently used types of currently available glue dispensers. The first type is the glue dispenser adopting small needle mode and the second type is the glue dispenser adopting replenishing mode.

The currently available glue dispenser adopting small needle mode has a glue dispensing needle cylinder and a detecting unit. When the detecting unit detects a substrate or a chip, the glue dispensing needle cylinder can add the glue to the bonding position of the chip or the substrate in order to perform the bonding process.

The currently available glue dispenser adopting replenishing mode has a replenishing tank, a glue dispensing needle cylinder and a detecting unit. The replenishing tank is coupled to the glue dispensing needle cylinder in order to replenish the glue dispensing needle cylinder with the glue. When the detecting unit detects a substrate or a chip, the glue dispensing needle cylinder can add the glue to the bonding position of the chip or the substrate. The replenishing tank keeps replenishing the glue dispensing needle cylinder with the glue.

However, the above two types of glue dispensers have their own shortcomings. The shortcoming of the glue dispenser adopting small needle mode is that the capacity of the glue dispensing needle cylinder is limited, Thus, it is necessary to always pay attention to the position of the fluid level of the glue inside the glue dispensing needle cylinder with a view replace the glue dispensing needle cylinder in time, which would waste a lot of manpower, time and increase the cost. The shortcoming of the glue dispenser adopting replenishing mode is that the replenishing tank keeps replenishing the glue dispensing needle cylinder with the glue, but there is no a proper replenishing control mechanism. Therefore, when the glue inside the glue dispensing needle cylinder exceeds the capacity thereof, the glue flows out of the glue dispensing needle cylinder.

SUMMARY OF THE INVENTION

The inventor of the present invention has tried hard to improve currently available glue dispensers in order to overcome the shortcomings of prior art. After conducting research and experiments for many years, the inventor of the present invention successfully develops a glue dispensing system and a glue supplying method thereof.

To achieve the foregoing objective, the embodiments of the present invention provides a glue dispensing system and a glue supplying method thereof, which uses at least one feed tank for supplying the glue and controls the flowing direction of the glue via a control valve in order to replenish the glue dispensing needle cylinder with the glue.

The present invention discloses a glue dispensing system, which includes at least one feed tank, at least one glue dispensing needle cylinder, a first fluid level detecting unit and a second fluid level detecting unit. The feed tank and the glue dispensing needle cylinder are coupled to a control valve. One end of the glue dispensing needle cylinder includes a glue dispensing valve. The first fluid level detecting unit is disposed on the glue dispensing needle cylinder in order to detect the position of the fluid level of the glue inside the glue dispensing needle cylinder. The second fluid level detecting unit is disposed on the feed tank in order to detect the position of the fluid level of the glue inside the feed tank.

In one embodiment of the present invention, the glue dispensing system includes a plurality of the feed tanks. The feed tanks include at least one first feed tank and at least one second feed tank. The first feed tank is coupled to the control valve via a pipe and the second feed tank is coupled to the pipe, and the junction between the pipe, the first feed tank and the second feed tank is provided with a valve body. The valve body is coupled to the second feed tank and the control valve respectively, and a third fluid level detecting unit is disposed on the second feed tank.

In one embodiment of the present invention, the glue dispensing system further includes a control unit. The control unit is electrically connected to the first fluid level detecting unit, the second fluid level detecting unit, the third fluid level detecting unit, the control valve, the valve body and the glue dispensing valve.

In one embodiment of the present invention, the first fluid level detecting unit, the second fluid level detecting unit and the third fluid level detecting unit are proximity switches, capacitive type transducers, proximity sensors or optical sensors.

In one embodiment of the present invention, the glue dispensing needle cylinder is a disposable needle cylinder or a reusable needle cylinder.

In one embodiment of the present invention, the control valve is a check valve, an electromagnetic valve or a one-way valve.

In one embodiment of the present invention, the control valve is disposed on one side of the glue dispensing needle cylinder, the top of the glue dispensing needle cylinder or the bottom of the glue dispensing needle cylinder.

The present invention also discloses a glue supplying method, which includes the following steps: detecting the position of the fluid level of the glue inside a glue dispensing needle cylinder and stopping a glue dispensing process performed by the glue dispensing needle cylinder when the position of the fluid level of the glue inside the glue dispensing needle cylinder is lower than a predetermined position; and supplying the glue to the glue dispensing needle cylinder by a feed tank via a control valve to increase the glue inside the glue dispensing needle cylinder, and turning off the control valve when the position of the fluid level of the glue inside the glue dispensing needle cylinder is higher than or equal to another predetermined position in order to stop glue supplied by the feed tank flowing into the glue dispensing needle cylinder.

In one embodiment of the present invention, the glue supplying method further includes a step of re-executing the glue dispensing process by the glue dispensing needle cylinder. In this step, a glue dispensing valve is turned on so as to re-execute the glue dispensing process after the glue dispensing needle cylinder is replenished with the glue.

In one embodiment of the present invention, the step of supplying the glue to the glue dispensing needle cylinder by the feed tank further includes the following step: when the glue inside the feed tank is lower than a predetermined position, switching the feed tank to another feed tank in order to supply the glue to the glue dispensing needle cylinder and emitting a signal or a warning signal in order to replace the feed tank whose glue level is lower than the predetermined position or supply the glue to the feed tank whose glue level is lower than the predetermined position.

According to the above glue dispensing system and the glue supplying method thereof, the difference between the present invention and the currently available glue dispensers is that the present invention uses at least one feed tank to provide or supply the glue to the glue dispensing needle cylinder. Thus, the glue dispensing needle cylinder does not need to be replaced or the frequency of replacing the glue dispensing needle cylinder can be reduced. Besides, the de-foaming step can be performed in advance when the material (the glue) is being added into the feed tank and the glue dispensing needle cylinder can be automatically replenished with the glue so as to save more time, reduce the manpower waste and lower the cost. In addition, the present invention uses several valve elements (such as the control valve or the valve body) to control the flowing direction of the glue with a view to avoid that the glue flows out of the glue dispensing needle cylinder when the glue dispensing needle cylinder is replenished with the glue or the glue inside the glue dispensing needle cylinder is insufficient. Moreover, the control valve can be turned off during the glue dispensing process in order to avoid that the glue flows back to the feed tank.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention, however it is not intended to limit the scope of the present invention.

Figure 1:
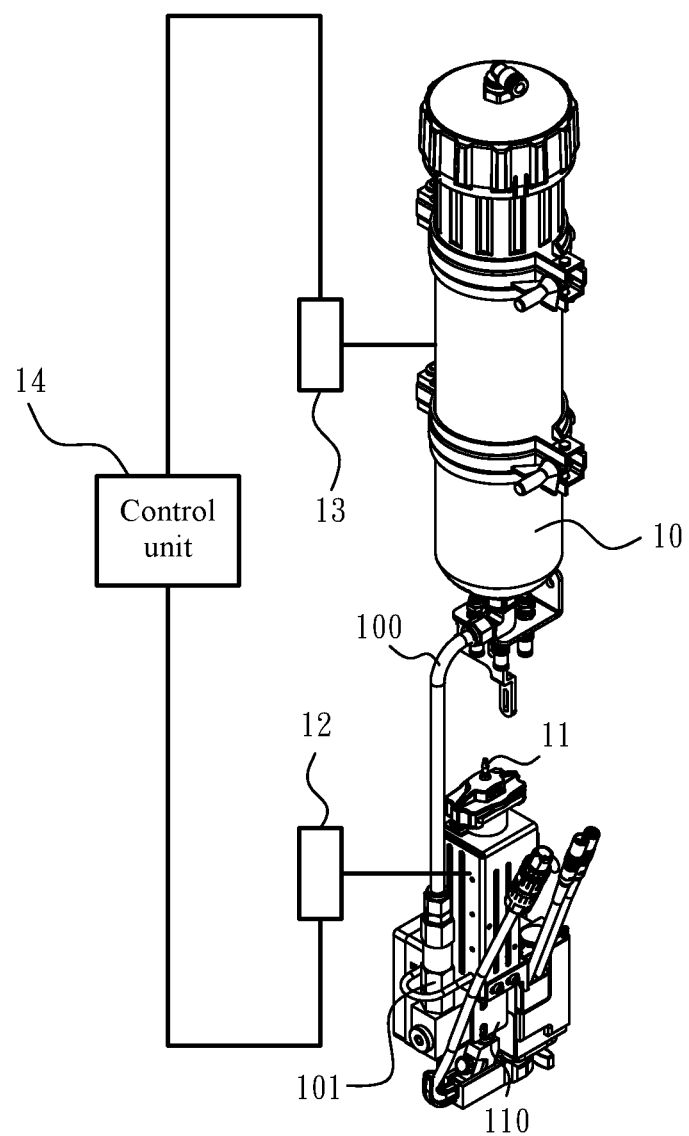
FIG. 1 is a schematic view of the glue dispensing system in accordance with one embodiment of the present invention.

Please refer to FIG. 1, which is the schematic view of the glue dispensing system in accordance with one embodiment of the present invention. As shown in FIG. 1, the glue dispensing system 1 includes a first feed tank 10, a glue dispensing needle cylinder 11, a first fluid level detecting unit 12, a second fluid level detecting unit 13 and a control unit 14.

The first feed tank 10 may be a glue needle cylinder with large capacity, in some implementations, it may be a raw material cylinder or other containers with large capacity. The first feed tank 10 may be a hollow container or cylinder and one end of the first feed tank 10 has an opening. The opening of the first feed tank 10 is coupled to a control valve 101 via a pipe 100. The control valve 101 may be a check valve, an electromagnetic valve or a one-way valve so as to avoid that the glue flows back to the first feed tank 10. The control valve 101 is coupled to the glue dispensing needle cylinder 11. One end of the glue dispensing needle cylinder 11 is provided with a glue dispensing valve 110. The glue dispensing needle cylinder 11 may be a disposable needle cylinder or a reusable needle cylinder.

In one embodiment, the control valve 101 may be disposed on the top of the glue dispensing needle cylinder 11, such that the glue can flow into the inner space of the glue dispensing needle cylinder 11 via the top thereof. In one embodiment, the control valve 101 may be disposed on one side of the glue dispensing needle cylinder 11, such that the glue can flow into the inner space of the glue dispensing needle cylinder 11 via one side thereof. In one embodiment, the control valve 101 may be disposed on the bottom of the glue dispensing needle cylinder 11, such that the glue can flow into the inner space of the glue dispensing needle cylinder 11 via the bottom thereof. As described above, the control valve 101 can effectively prevent from generating bubbles when the glue flows into the glue dispensing needle cylinder 11.

The first fluid level detecting unit 12 is disposed on the glue dispensing needle cylinder 11 so as to detect the position of the fluid level of the glue inside the glue dispensing needle cylinder 11. The second fluid level detecting unit 13 is disposed on the first feed tank 10 so as to detect the position of the fluid level of the glue inside the first tank 10. The first fluid level detecting unit 12 and the second fluid level detecting unit 13 may be proximity switches, capacitive type transducers, proximity sensors or optical sensors. The detecting mechanisms of proximity switches, capacitive type transducers, proximity sensors and optical sensors are already known by those skilled in the art, so will not be described herein again.

The control unit 14 is electrically connected to the control valve 101, the glue dispensing valve 110, the first fluid level detecting unit 12 and the second fluid level detecting unit 13.

The first fluid level detecting unit 12 detects the position of the fluid level of the glue inside the glue dispensing needle cylinder 11 and transmits a detecting signal to the control unit 14. The control unit 14 determines the position of the fluid level of the glue inside the glue dispensing needle cylinder 11 according to the detecting signal of the first fluid level detecting unit 12. When the glue dispensing process is being performed and the position of the fluid level of the glue inside the glue dispensing needle cylinder 11 is lower than a predetermined position, the control unit 14 transmits a switching signal (e.g., a turn-off signal) to the glue dispensing valve 110 to turn off the glue dispensing valve 110. Then, the control unit 14 transmits a switching signal (e.g., a turn-on signal) to turn on the control valve 101, such that the glue inside the first feed tank 10 can flow into the glue dispensing needle cylinder 11. Afterward, the first fluid level detecting unit 12 detects the position of the fluid level of the glue inside the glue dispensing needle cylinder 11 again and then transmits the detecting signal to the control unit 14. When the position of the fluid level of the glue inside the glue dispensing needle cylinder 11 is greater than or equal to another predetermined position, the control unit 14 transmits the switching signal (e.g., a turn-off signal) to the control valve 11 so as to turn off the control valve 101, such that the glue inside the first feed tank 10 cannot flow into the glue dispensing needle cylinder 11. Finally, the control unit 14 transmits the switching signal (e.g., a turn-on signal) to the glue dispensing valve 110 to turn on the glue dispensing valve 110 in order to execute the glue dispensing process.

Figure 2:
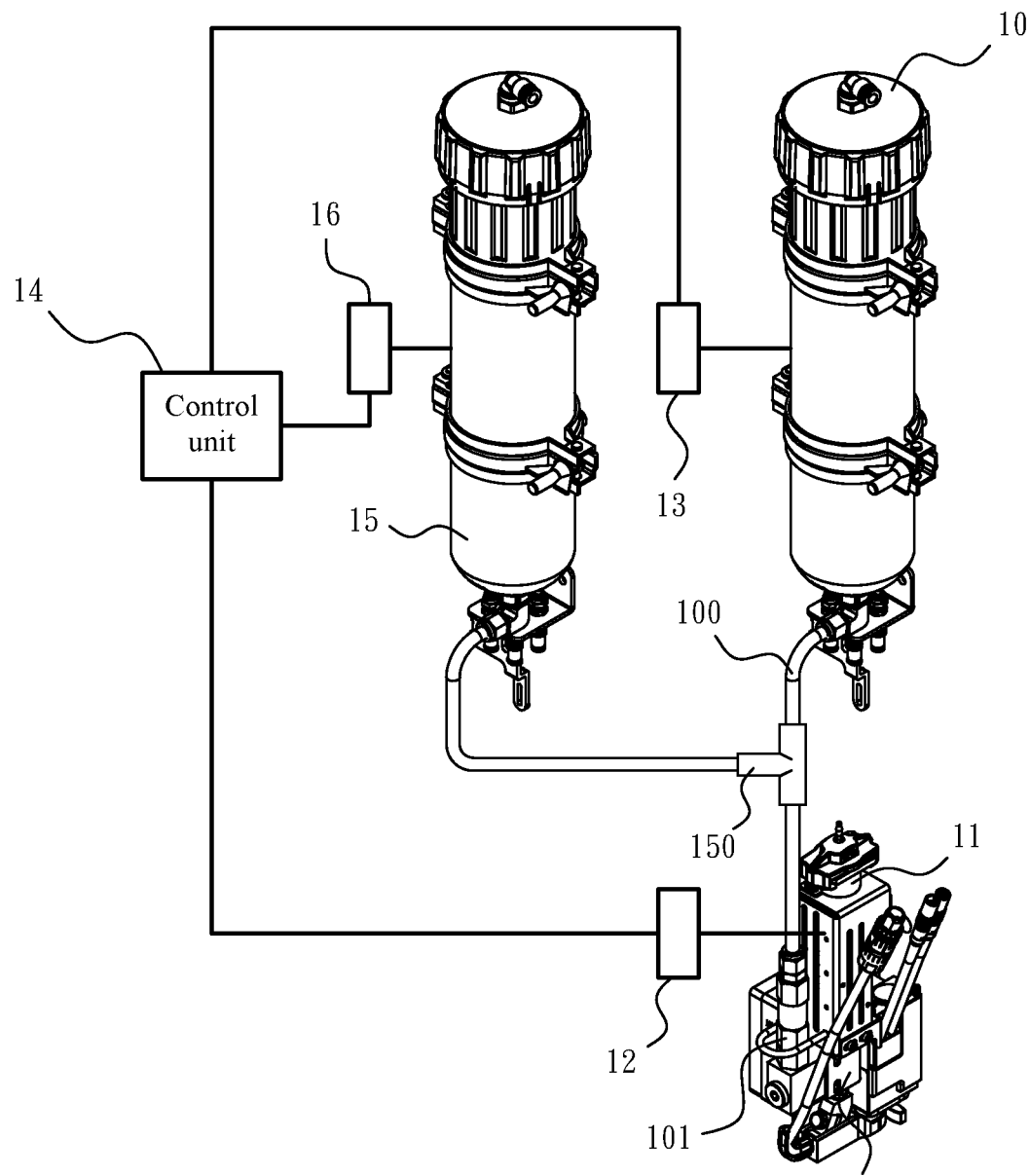
FIG. 2 is a schematic view of the glue dispensing system in accordance with another embodiment of the present invention.

Please refer to FIG. 2, which is the schematic view of the glue dispensing system in accordance with another embodiment of the present invention. As shown in FIG. 2, the glue dispensing system 1 includes a first feed tank 10, a second feed tank 15, a glue dispensing needle cylinder 11, a first fluid level detecting unit 12, a second fluid level detecting unit 13, a third fluid level detecting unit 16 and a control unit 14. In this embodiment, the operational mechanisms and the corporation relations of the first feed tank 10, the pipe 100, the control valve 101, the glue dispensing needle cylinder 11, the glue dispensing valve 110, the first fluid level detecting unit 12, the second fluid level detecting unit 13 and the control unit 14 are the same with those of the previous embodiment, so the reference signs of the above elements also remain unchanged.

The function and structure of the second feed tank 15 are just the same with those of the first feed tank 10. The opening of the second feed tank 15 is coupled to the pipe 100. Besides, there is a valve body 150 disposed at the junction between the pipe 100, the first feed tank 10 and the second feed tank 15. The valve body 150 is electrically connected to the control unit 14. The valve body 150 may be an electromagnetic valve or a three-way valve.

The function and structure of third fluid level detecting unit 16 are just the same with those of the first fluid level detecting unit 12. The third fluid level detecting unit 16 is disposed on the second feed tank 15 in order to detect the position of the fluid level inside the second feed tank 15. The third fluid level detecting unit 16 is electrically connected to the control unit 14. In another embodiment, the quantity of the feed tanks (the first feed tank 10 and the second feed tank 15) may be one or more than one. Similarly, the quantity of the fluid level detecting units (the second fluid level detecting unit 13 and the third level detecting unit 16) may be one or more than one.

In this embodiment, when the first feed tank 10 supplies the glue to the glue dispensing needle cylinder 11 and the second fluid detecting unit 13 detects the position of the fluid level of the first feed tank 10 is lower than a predetermined position, the second fluid level detecting unit 13 transmits the detecting signal to the control unit 14. Then, the control unit 14 transmits a switching signal to the valve body 150 to switch the valve body 150, such that the second feed tank 15 supplies the glue to the glue dispensing needle cylinder 11. The first fluid level detecting unit 12 detects the position of the fluid level of the glue inside the glue dispensing needle cylinder 11 and transmits the detecting signal to the control unit 14. When the position of the fluid level of the glue dispensing needle cylinder 11 is higher than or equal to the predetermined position, the control unit 14 transmits the switching signal to the valve body 150 and the control valve 110 to selectively switch the valve body 150 and turn off the control valve 110. In this way, the glue inside the second feed tank 15 cannot flow into the glue dispensing needle cylinder 11. If the second feed tank 15 keeps supplying the glue to the glue dispensing needle cylinder 11 during the glue dispensing process, the valve body 150 would still keep the channel between the second feed tank 15 and the control valve 101 open. If the second feed tank 15 stops supplying the glue to the glue dispensing needle cylinder 11, the valve body 150 switches the second feed tank 15 to the first feed tank 10 to open the channel between the first feed tank 10 and the control valve 101. Then, the first feed tank 10 supplies the glue to the glue dispensing needle cylinder 11 during the glue dispensing process.

The valve body 150, in one supplementation, may be a three-way valve. Therefore, when the first feed tank 10 supplies the glue to the glue dispensing needle cylinder 11, the valve body 150 closes the channel between the second feed tank 15 and the control valve 101, and opens the channel between the first feed tank 10 and the control valve 101. In this way, the glue inside the first feed tank 10 can pass through the valve body 150 and the control valve 101 to flow into the glue dispensing needle cylinder 11. Meanwhile, the valve body 150 can prevent the glue inside the first feed tank 10 from flowing into the second feed tank 15 via the pipe 100. Similarly, when the second feed tank 15 supplies the glue to the glue dispensing needle cylinder 11, the valve body 150 closes the channel between the first feed tank 10 and the control valve 101, and then opens the channel between the second feed tank 15 and the control valve 101.

When the second feed tank 15 supplies the glue to the glue dispensing needle cylinder 11, the control unit 14 transmits a signal or a warning signal to the technician. In this way, the technician can add the glue to the first feed tank 10 or replace the first feed tank 10.

If the third fluid level detecting unit 16 detects the position of the fluid level of the glue inside the second feed tank 15 is lower than the predetermined position, the control unit 14 controls the valve body 150 to switch the second feed tank 15 to the first feed tank 10. Then, the first feed tank 10 supplies the glue to the glue dispensing needle cylinder 11. Meanwhile, the control unit 14 transmits the signal or the warning signal to the technician, such that the technician can add the glue to the second feed tank 15 or replace the second feed tank 15.

Figure 3:
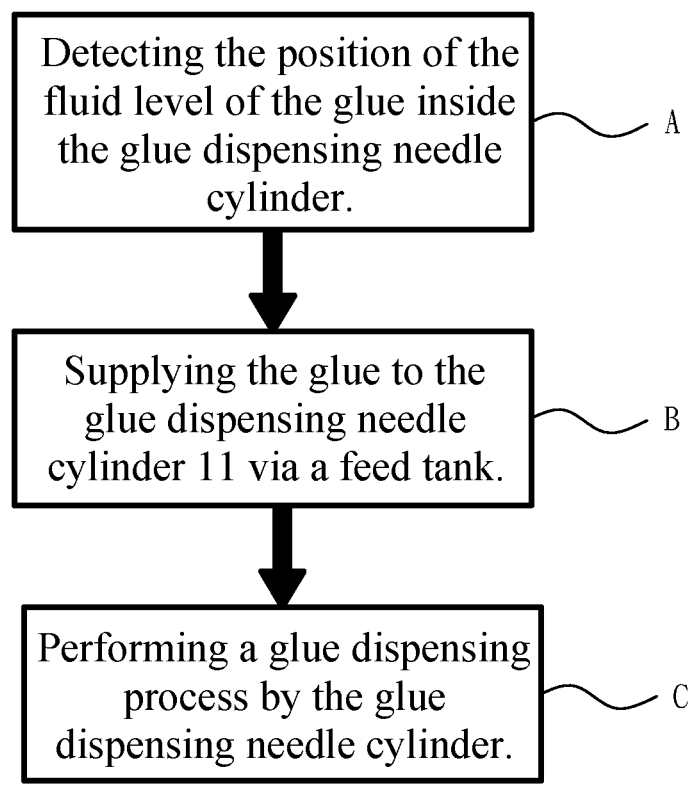
FIG. 3 is a flow chart of the glue supplying method in accordance with one embodiment of the present invention.

Please refer to FIG. 3, which is the flow chart of the glue supplying method in accordance with one embodiment of the present invention. As shown in FIG. 3, the glue supplying method includes the following steps:

Step A: detecting the position of the fluid level of the glue inside the glue dispensing needle cylinder 11. Please further refer to FIG. 1, when the first fluid level detecting unit 12 detects the position of the fluid level of the glue inside the glue dispensing needle cylinder 11 is lower than the predetermined position, the control unit 14 receives the detecting signal out of the first fluid level detecting unit 12. If the glue dispensing needle cylinder 11 is performing glue dispensing process via the glue dispensing valve 110, the control unit 14 turns off the glue dispensing valve 110 and then turns on the control valve 101.

Figure 4:
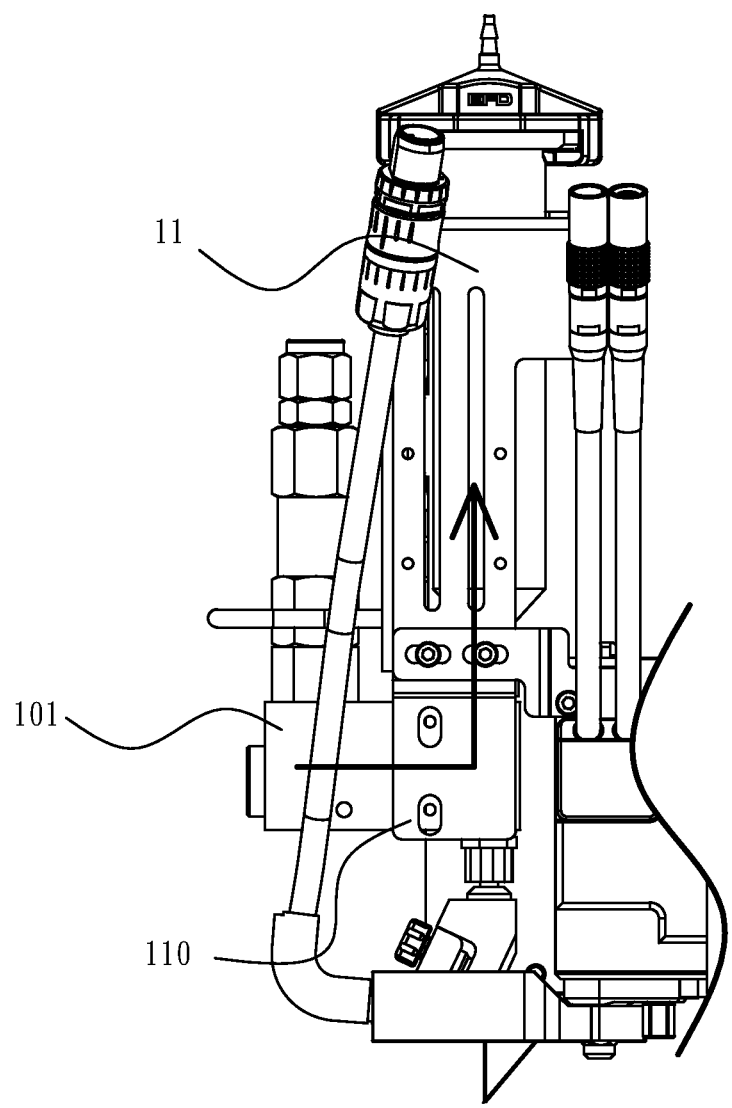
FIG. 4 is a schematic view of replenishing the glue dispensing needle cylinder with the glue in accordance with one embodiment of the present invention.

Step B: supplying the glue to the glue dispensing needle cylinder 11 via a feed tank. Please refer to FIG. 4, which is the schematic view of replenishing the glue dispensing needle cylinder with the glue in accordance with one embodiment of the present invention. The glue inside the first feed tank 10 flows into the glue dispensing needle cylinder 11 via the pipe 100, such that the glue dispensing needle cylinder 11 can be replenished with the glue. The first fluid level detecting unit 12 detects the position of the fluid level of the glue inside the glue dispensing needle cylinder 11 again and then transmits the detecting signal to the control unit 14. When the position of the fluid level of the glue dispensing needle cylinder 11 is higher than or equal to another predetermined position, the control unit 14 transmits a turn off signal to the control valve 101 in order to turn off the control valve 101, such that the glue inside the first feed tank 10 cannot flow into the glue dispensing needle cylinder 11.

Please refer to FIG. 2 again, if the second fluid level detecting unit 13 detects the position of the fluid level of the glue inside the first feed tank 10 is lower than the predetermined position, the second fluid level detecting unit 13 transmits the detecting signal to the control unit 14. Next, the control unit 14 transmits the switching signal to the valve body 150 to switch the first feed tank 10 to the second feed tank 15, such that the second feed tank 15 supplies to the glue dispensing needle cylinder 11. Then the first fluid level detecting unit 12 keeps detecting the position of the fluid level of the glue inside the glue dispensing needle cylinder 11 and transmits the detecting signal to the control unit 14. When the position of the fluid level of the glue inside the glue dispensing needle cylinder 11 is higher than or equal to the predetermined position, the control unit 14 transmits the switching signal to the valve body 150 and the control valve 101 in order to selectively switch the control valve 150 and turn off the control valve 101. In this way, the glue inside the second feed tank 15 cannot flow into the glue dispensing needle cylinder 11. When the second feed tank 15 supplies the glue to the glue dispensing needle cylinder 1, the control unit 14 transmits the signal or the warning signal to the technician, such that the technician can add the glue to the first feed tank 10 or replace the first feed tank 10. Similarly, if the third fluid level detecting unit 16 detects that the position of the fluid level of the glue inside the second feed tank 15 is lower than the predetermined position, the control unit 14 transmits the signal or the warning signal to the technician, such that the technician can add the glue to the second feed tank 15 or replace the second feed tank 15.

Figure 5:
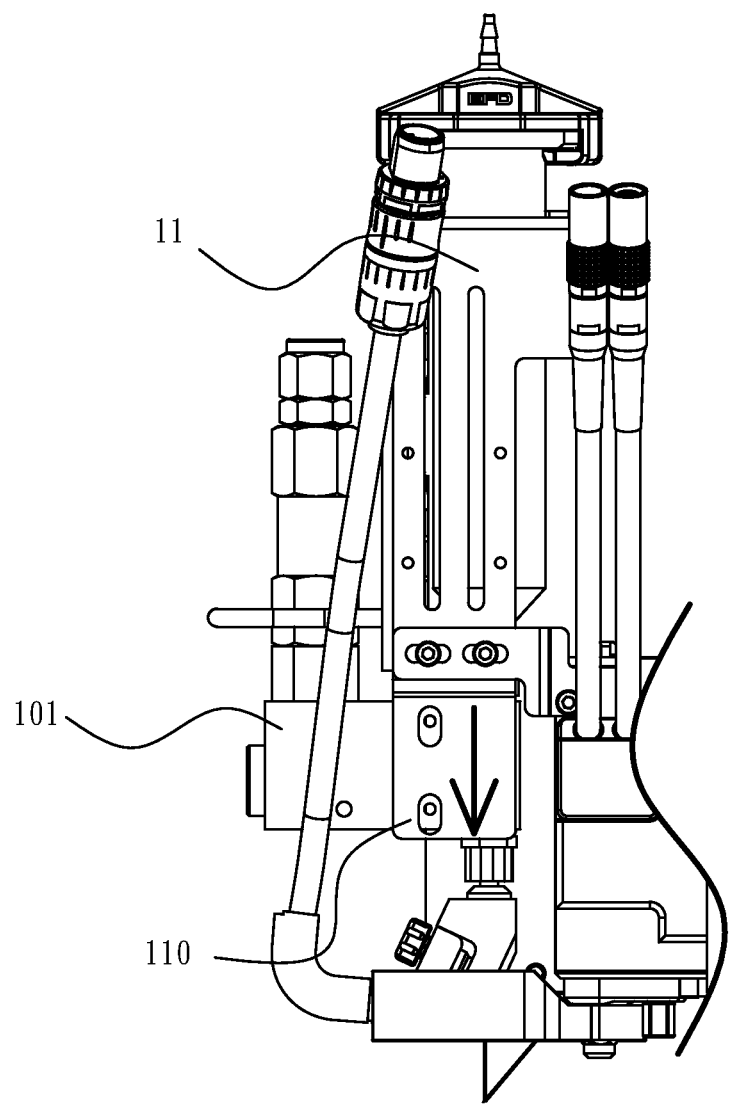
FIG. 5 is a schematic view of executing the glue dispensing process in accordance with one embodiment of the present invention.

Step C: performing a glue dispensing process by the glue dispensing needle cylinder 11. Please refer to FIG. 5, which is the schematic view of executing the glue dispensing process in accordance with one embodiment of the present invention. When the glue dispensing needle cylinder 11 is replenished with the glue, the glue dispensing needle cylinder 11 can perform the glue dispensing process. In the case, the control unit 14 transmits a turn-on signal to the glue dispensing valve 110 to turn on the glue dispensing valve 110 so as to execute the glue dispensing process. The control valve 101 is in off state during the glue dispensing process so as to avoid that the glue inside the glue dispensing needle cylinder 11 flows back to the feed tank (the first feed tank 10 or the second feed tank 15) via the control valve 101 and the pipe 100.

In addition, in one embodiment, one feed tank (the first feed tank 10 or the second feed tank 15) can be coupled to several glue dispensing needle cylinders 11 with a view to supply the glue to these glue dispensing needle cylinders 11 or replenish these glue dispensing needle cylinders 11 with the glue. Alternatively, the feed tank can supply the glue to these glue dispensing needle cylinders 11 by turns or replenish these glue dispensing needle cylinders 11 with the glue by turns. In another embodiment, there may be several feed tanks and these feed tanks can supply the glue to a plurality of glue dispensing needle cylinders 11 respectively.

To sum up, according to the embodiments of the present invention, the glue dispensing system can use the feed tank (the first feed tank 10 or the second feed tank 15) to provide or supply the glue to the glue dispensing needle cylinder 11. Thus, the glue dispensing needle cylinder 11 does not need to be replaced or the frequency of replacing the glue dispensing needle cylinder 11 can be decreased. Besides, the de-foaming step can be performed in advance when the material (the glue) is being added into the feed tank and the glue dispensing needle cylinder 11 can be automatically replenished with the glue so as to save more time, reduce the manpower waste and lower the cost. Moreover, according to the embodiments of the present invention, the glue dispensing system can use several valve elements (such as the control valve 101 or the valve body 50) to control the flowing direction of the glue with a view to avoid that the glue flows out of the glue dispensing needle cylinder 11 when the glue dispensing needle cylinder 11 is replenished with the glue or the glue inside the glue dispensing needle cylinder 11 is insufficient. Moreover, the control valve 101 can be turned off during the glue dispensing process in order to avoid that the glue flows back to the feed tank (the first feed tank 10 or the second feed tank 15).

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A glue dispensing system, comprising:
a first feed tank, coupled to a control valve;
a second feed tank, coupled to the control valve;
a glue dispensing needle cylinder, coupled to the control valve, wherein one end of the glue dispensing needle cylinder comprises a glue dispensing valve;
a first fluid level detecting unit, disposed on the glue dispensing needle cylinder and configured to detect a position of a fluid level of a glue inside the glue dispensing needle cylinder;
a second fluid level detecting unit, disposed on the first feed tank and configured to detect a position of a fluid level of a glue inside the first feed tank; and
a third fluid level detecting unit, disposed on the second feed tank and configured to detect a position of a fluid level of a glue inside the second feed tank.

2. The glue dispensing system of claim 1, wherein the first feed tank is coupled to the control valve via a pipe and the second feed tank is coupled to the pipe, and a junction between the pipe, the first feed tank and the second feed tank is provided with a valve body, wherein the valve body is coupled to the second feed tank and the control valve respectively.

3. The glue dispensing system of claim 1, further comprising a control unit electrically connected to the first fluid level detecting unit, the second fluid level detecting unit, the third fluid level detecting unit, the control valve, and the glue dispensing valve.

4. The glue dispensing system of claim 1, wherein the first fluid level detecting unit, the second fluid level detecting unit, and the third fluid level detecting unit are proximity switches, capacitive type transducers, proximity sensors, or optical sensors.

5. The glue dispensing system of claim 1, wherein the glue dispensing needle cylinder is a disposable needle cylinder or a reusable needle cylinder.

6. The glue dispensing system of claim 1, wherein the control valve is a check valve, an electromagnetic valve, or a one-way valve.

7. The glue dispensing system of claim 1, wherein the control valve is disposed on one side of the glue dispensing needle cylinder, the top of the glue dispensing needle cylinder or the bottom of the glue dispensing needle cylinder.

8. A glue supplying method, comprising:
providing a glue dispensing system, the glue dispensing system including (i) a glue dispensing needle cylinder coupled to a control valve, (ii) a first feed tank coupled to the control valve, (iii) a second feed tank coupled to the control valve, (iv) a first fluid level detecting unit configured to detect a position of a fluid level of a glue inside the glue dispensing needle cylinder, (v) a second fluid level detecting unit configured to detect a position of a fluid level of a glue inside the first feed tank, and (vi) a third fluid level detecting unit configured to detect a position of a fluid level of a glue inside the second feed tank;
detecting the position of the fluid level of the glue inside the glue dispensing needle cylinder using the first fluid level detecting unit;
supplying glue to the glue dispensing needle cylinder from the first feed tank via the control valve to increase the glue inside the glue dispensing needle cylinder when the position of the fluid level of the glue inside the glue dispensing needle cylinder is lower than a predetermined position; and
supplying glue to the glue dispensing needle cylinder from the second feed tank via the control valve to increase the glue inside the glue dispensing needle cylinder when the second fluid level detecting unit detects the position of the fluid level of the glue inside the first feed tank is lower than a predetermined position.

9. The glue supplying method of claim 8, including stopping a glue dispensing process performed by the glue dispensing needle cylinder when the position of the fluid level of the glue inside the glue dispensing needle cylinder is lower than the predetermined position, and further comprising a step of re-executing the glue dispensing process by the glue dispensing needle cylinder, wherein a glue dispensing valve is turned on so as to re-execute the glue dispensing process after the glue dispensing needle cylinder is replenished with glue.

10. The glue supplying method of claim 8 further comprising a step of
emitting a signal or a warning signal in order to (i) replace the first feed tank or second feed tank if the respective glue level is lower than the respective predetermined position, or (ii) supply glue to the first feed tank or second feed tank if the respective glue level is lower than the respective predetermined position.

11. The glue supplying method of claim 8, further comprising a step of turning off the control valve when the position of the fluid level of the glue inside the glue dispensing needle cylinder is higher than or equal to another predetermined position in order to stop glue from flowing into the glue dispensing needle cylinder.

12. The glue supplying method of claim 8, further comprising a step of supplying glue to the glue dispensing needle cylinder from the first feed tank via the control valve to increase the glue inside the glue dispensing needle cylinder when the third fluid level detecting unit detects a position of a fluid level of the glue inside the second feed tank is lower than a predetermined position, after the step of supplying glue to the glue dispensing needle cylinder from the second feed tank.

13. The glue supplying method of claim 8, wherein the step of supplying glue to the glue dispensing needle cylinder from the second feed tank includes sending a switching signal from a control unit to a valve body, the valve body configured to switch the one of the first feed tank and the second feed tank that supplies the glue to the glue dispensing needle cylinder, wherein the control unit is electrically connected to the first fluid level detecting unit, the second fluid level detecting unit, the third fluid level detecting unit, and the valve body.

14. The glue dispensing system of claim 1, further comprising a valve body configured to switch between which of the first feed tank and the second feed tank is supplying glue to the glue dispensing needle cylinder.

15. The glue dispensing system of claim 14, wherein the valve body is at least one of (i) an electromagnetic valve, and (ii) a three-way valve.

16. The glue dispensing system of claim 1, wherein the first feed tank is a glue needle cylinder.

17. The glue dispensing system of claim 1, further comprising at least one additional feed tank, wherein the at least one additional feed tank is coupled to the control valve.

18. The glue dispensing system of claim 1, wherein the first feed tank is configured to be replaced and the second feed tank is configured to have glue added.

19. The glue dispensing system of claim 1, wherein the first feed tank and the second feed tank are configured to be replaced.

20. The glue dispensing system of claim 1, further comprising at least one additional glue dispensing cylinder, wherein the first feed tank and the second feed tank are configured to supply glue to the at least one additional glue dispensing cylinder.

* * * * *